Figure 1:
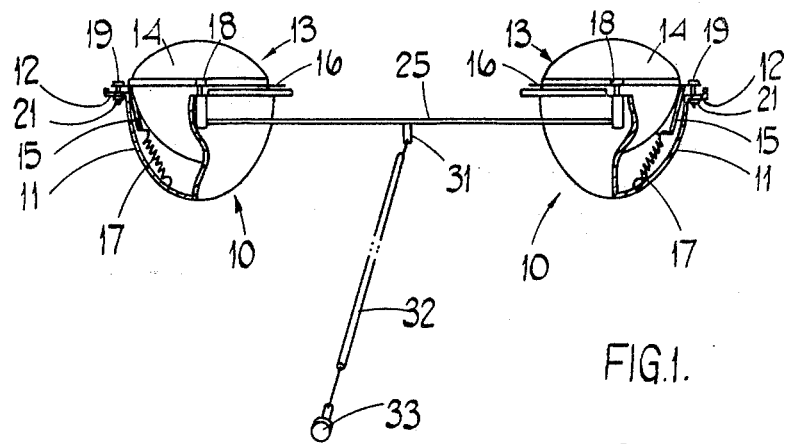

United States Patent [19]
Jenkinson

[11] 4,086,481
[45] Apr. 25, 1978

[54] VEHICLE LAMPS

[75] Inventor: Jeremy Mark Jenkinson, Solihull, England

[73] Assignee: Lucas Industries Limited, Birmingham, England

[21] Appl. No.: 769,961

[22] Filed: Feb. 18, 1977

Related U.S. Application Data

[63] Continuation of Ser. No. 618,160, Sep. 30, 1975, abandoned.

[30] Foreign Application Priority Data

Oct. 16, 1974 United Kingdom ............... 44791/74

[51] Int. Cl.² ............................................. B60Q 1/06
[52] U.S. Cl. ................................................. 362/428
[58] Field of Search .................... 240/61.2, 61.3, 61.4, 240/61.6, 61.8, 7.1 LJ, 7.1 R

[56] References Cited

U.S. PATENT DOCUMENTS

| 1,091,976 | 3/1914 | Snowden | 240/61.4 |
|---|---|---|---|
| 1,406,955 | 2/1922 | Asbjeld | 240/61.8 |
| 1,520,551 | 12/1924 | Raver | 240/61.8 |
| 1,543,951 | 6/1925 | Pierce | 240/61.8 |
| 1,601,828 | 10/1926 | Hazelton | 240/61.8 |
| 1,690,019 | 10/1928 | Kern | 240/61.8 |
| 1,970,331 | 8/1934 | McCoy | 240/61.3 |
| 2,605,388 | 7/1952 | Theisen | 240/61.8 |
| 2,719,217 | 9/1955 | Lemons | 240/61.8 |
| 2,901,595 | 8/1959 | Shosted | 240/61.6 |

FOREIGN PATENT DOCUMENTS 1,148,761  9/1966  United Kingdom ............... 240/61.8

Primary Examiner—L. T. Hix
Assistant Examiner—Alan Mathews
Attorney, Agent, or Firm—Holman & Stern

[57] ABSTRACT

A lamp comprises a lamp unit adjustably secured to a support member which support member is mounted on a vehicle. A nut mounted on the support member and a screw carried by the lamp unit are mutually engaged and provide a fine adjustment of the lamp unit. A spring urges the nut away from the support member and a rotatable cam acts on the nut in opposition to the spring to provide a coarse adjustment of the lamp unit when rotated in use. The cam is connected to a remote control linkage so as to be operable from a position remote from the lamp unit.

A novel lamp assembly comprises a pair of lamps of the type described above coupled together so as to be operable synchronously from the said remote position.

1 Claim, 4 Drawing Figures

U.S. Patent       April 25, 1978       4,086,481

VEHICLE LAMPS

This is a continuation of application Ser. No. 618,160, filed Sept. 30, 1975 now abandoned.

This invention relates to an improvement in or modification of our British Pat. No. 1,148,761, which is concerned with a lamp of the kind comprising a support member adapted to be secured to a vehicle, a lamp unit, and means securing the lamp unit to the support member.

In Claim 1 of British Pat. No. 1,148,761, there is claimed a vehicle lamp of this kind comprising a pair of relatively adjustable parts providing fine adjustment of the lamp unit, one of said parts being engaged with the lamp unit, and an adjustable device for varying the position of the pair of parts relative to the support member to provide coarse adjustment of the lamp unit.

In a preferred arrangement described in British Pat. No. 1,148,761 and claimed in Claim 2 thereof, the pair of parts are a nut and a screw and the said device is a cam, rotation of the cam serving to move the screw and nut, and therefore the lamp unit, relatively to the support member and thereby effect a coarse adjustment of the position of the lamp unit, and rotation of the screw relative to the nut serving to effect a fine adjustment of the position of the lamp unit.

According to the present invention, there is provided a vehicle lamp as claimed in Claim 2 of British Pat. No. 1,148,761, wherein there is provided resilient means acting on said nut and urging the latter away from said support member, and said cam acts on said nut and is arranged, when rotated in use, to move the latter against the action of said resilient means.

Also according to the present invention, there is provided a vehicle lamp as claimed in Claim 1 of British Pat. No. 1,148,761, wherein said device is connected to a remote control linkage so as to be operable manually from a position remote from said lamp unit.

Also according to the invention, there is provided a lamp assembly comprising two vehicle lamps, each being of the type defined in the last preceding paragraphs, coupled together so as to be operable synchronously from said remote position.

Figure 2:
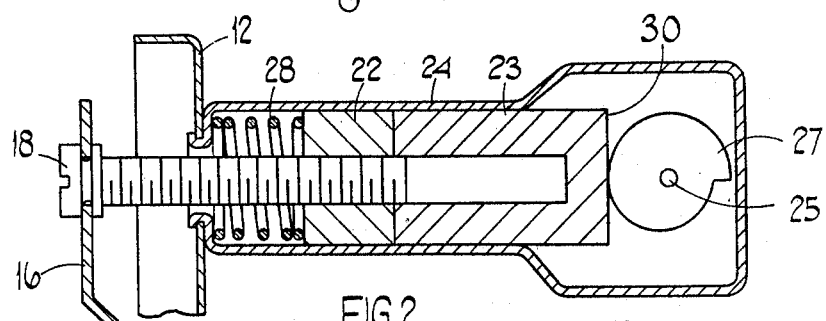
Figure 3:
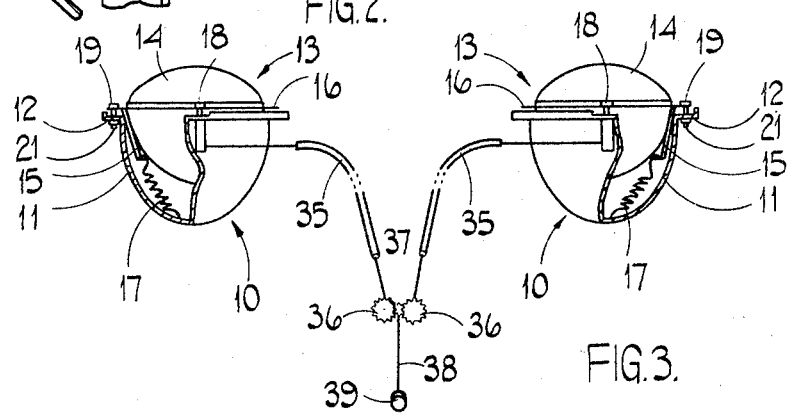
Figure 4:
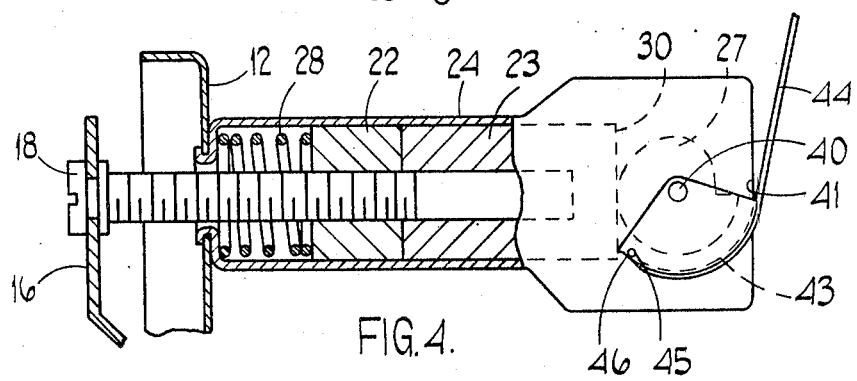

Embodiments of the present invention will now be described, by way of example, with reference to the accompanying drawings, in which:

FIG. 1 is a schematic view of two vehicle lamps according to the present invention, FIG. 2 is a section through part of one of the lamps of FIG. 1, FIG. 3 is a schematic view of two further vehicle lamps, also according to the present invention, and FIG. 4 is a view, partly in section, of part of a modified vehicle lamp, also according to the present invention.

Referring to FIG. 1, each of two lamps 10 is substantially the same as that described in British Pat. No. 1,148,761, and similar parts have been accorded the same reference numerals. Each lamp 10, however, differs from that described in British Pat. No. 1,148,761 in the arrangement of rod 25, cam 27 and spring 28.

As shown in FIG. 2, the spring 28 is disposed between nut 22 and the end of sleeve 24 adjacent flange 12, and tends to urge nut 22 and sleeve 23 away from flange 12. The cam 27 engages a flat outer surface 30 of the closed end of sleeve 23. When rotated in use, the cam 27 acts on nut 22 and sleeve 23 to move them against the action of spring 28. This movement is transmitted to the lamp unit 13 by means of screw 18, thereby tilting the lamp unit 13 in a manner similar to that described in British Pat. No. 1,148,761.

Referring back to FIG. 1, the cam 27 of each lamp 10 is mounted on a common rod 15 for rotation therewith, the cams 27 having the same angular orientation with respect to the rod 25. The knob 26 used in the vehicle lamp of British Pat. No. 1,148,761 is now omitted. A lever 31 is mounted on rod 25 also for rotation therewith. One end of a BOWDEN cable 32 is connected to lever 31 at a location spaced from rod 25. The other end of the cable 32 is connected to a push/pull knob 33 located in a driving compartment of the vehicle (not shown).

In use, operation of knob 33 causes rotation of rod 25 through the intermediary of cable 32 and lever 31. This rotation of rod 25 causes the cams 27 to rotate together, thereby simultaneously tilting both lamp units 13 by the same amount. Thus it will be manifest that the lamp units 13 can be tilted by a manual operation at a position remote from the lamp units 13.

A scale indicating the amount by which the lamp units 13 are tilted for a given movement of knob 33 can be provided. In this case, in order for the scale to be accurate, any backlash in the cable 32 and cams 27 is eliminated.

In an alternative embodiment (not illustrated), the rod 25 is rotated by means of a gear form, rather than by the lever 31, the gear form being mounted on the rod 25 and being driven by a rack connected with the cable 32. In a further embodiment (also not illustrated), the rod 25 itself is replaced by a flexible cable capable of transmitting rotary motion imparted to a gear form or lever to which it is connected.

The gear form or lever, as the case may be, can also be operated from the driving compartment by means of a single rod, a flexible rack of the type used for driving windscreen wiper blades, or a system of levers, in place of the BOWDEN cable 32 and knob 33.

In FIG. 3, there is shown a pair of vehicle lamps 10 similar to those described above, similar parts being accorded the same reference numerals. However, the cams (not shown) are not interconnected as before, but are each attached to a respective flexible cable 35 adapted to transmit rotary motion to the cam from a respective gear 36. The gears 36 both mesh with a further gear 37 mounted on a rod 38 for rotation therewith. A knob 39 is also mounted on the rod 38 so as to be rotatable from a driving compartment of the vehicle (not shown).

In use, rotation of knob 39 causes the gears 36 to rotate in the same direction through the intermediary of gear 37. This rotary motion is transmitted to the cams by the respective cables 35, thereby tilting the lamp units 13 as indicated above, the arrangement being such that the lamp units 13 are tilted by the same amount.

A scale indicating the amount by which the lamp units 13 are tilted for a given movement of knob 39 can be provided. In this case, any backlash in the gears 36, 37, the cables 35 and the cams is eliminated in order for the scale to be accurate.

In alternative embodiments (not illustrated), each cam is operated by the respective gear 36 through the intermediary of a single rod, a flexible rack of the type used for driving windscreen wiper blades, or a system of levers, in place of the cable 35.

FIG. 4 shows a modification of the vehicle lamp described above. The part of the vehicle lamp shown in FIG. 4 is similar to that shown in FIG. 2, similar items being accorded the same reference numerals. The cams 27 (only one shown) are not interconnected, but are mounted on respective shafts 40 for rotation therewith.

Each shaft 40 is rotatably mounted on the sleeve 24, and has fixed thereto a sector 41 of a pulley wheel. An end portion of a BOWDEN cable 44 locates in a groove 43 of the sector 41, and a nipple 45 fixed on the end of the former engages a cut-out 46 in the sector, thereby anchoring the BOWDEN cable 44 to the sector 41.

The BOWDEN cable 44 associated with each cam 27 is led off to a driving compartment of the vehicle (not shown), where it is connected to a respective push/pull knob (also not shown). The lamp units of the vehicle can thus be tilted independently by manual operation of the appropriate knob. Alternatively, both BOWDEN cables 44 can be led off to a single push/pull knob, thereby enabling the vehicle lamp units to be tilted simultaneously by the same amount.

In a further alternative arrangement a single sector 41 and single cable 44 are provided and the shafts 40 are interconnected. In place of sector 41, a complete pulley wheel can be used.

In FIGS. 2 and 4, the cam 27 is illustrated as having a surface of continuously increasing radius. However, the surface may equally well be of stepped form.

I claim:
1. A lamp comprising:
   a support member for securing to a vehicle;
   a lamp unit; and
   securing means for adjustably securing said lamp unit to said support member, said securing means comprising a nut and screw assembly for providing a fine adjustment of said lamp unit relative to said support member, a rotatable cam means, carried by said support member and bearing against a part of said assembly, for providing a coarse adjustment of said lamp unit relative to said support member and for adjustably preventing movement of said lamp unit towards said support member, and resilient means for urging said part of said assembly away from said support member and for urging said lamp unit towards said support member.

* * * * *